Feb. 10, 1925.
A. F. JONES
BOX COVERING MACHINE
Filed March 13, 1924
1,525,612
8 Sheets-Sheet 6
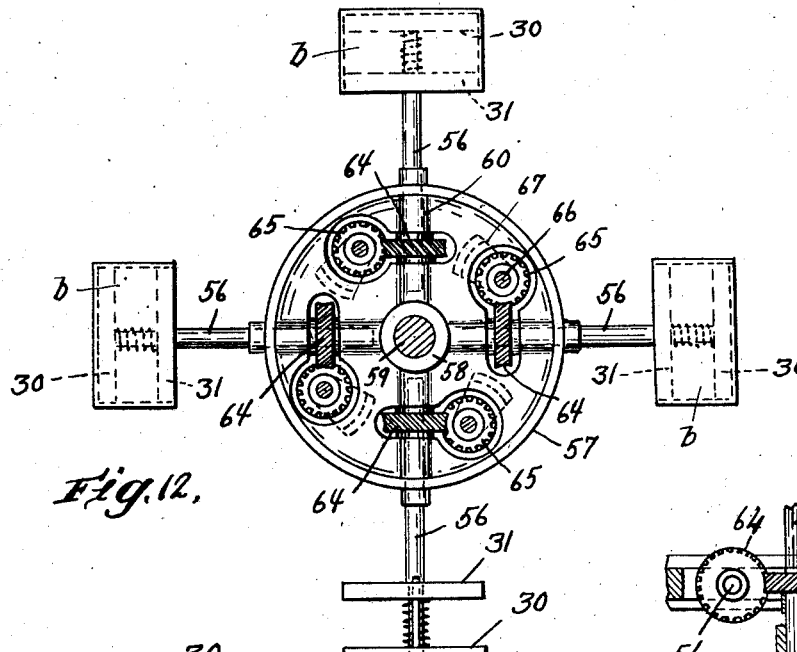
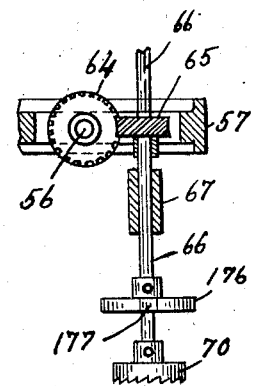
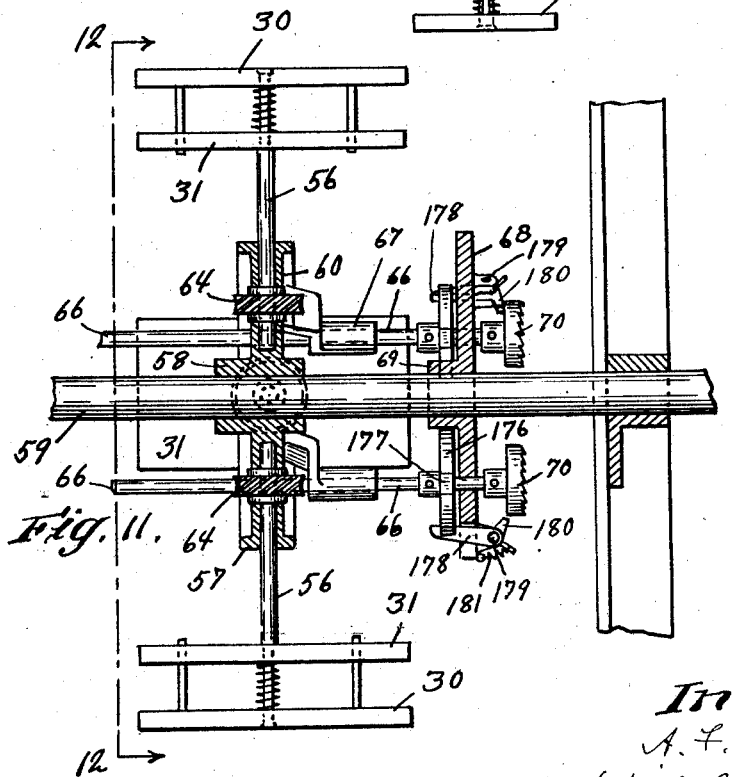
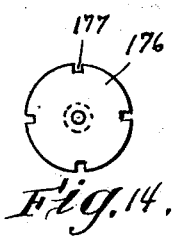
Inventor.

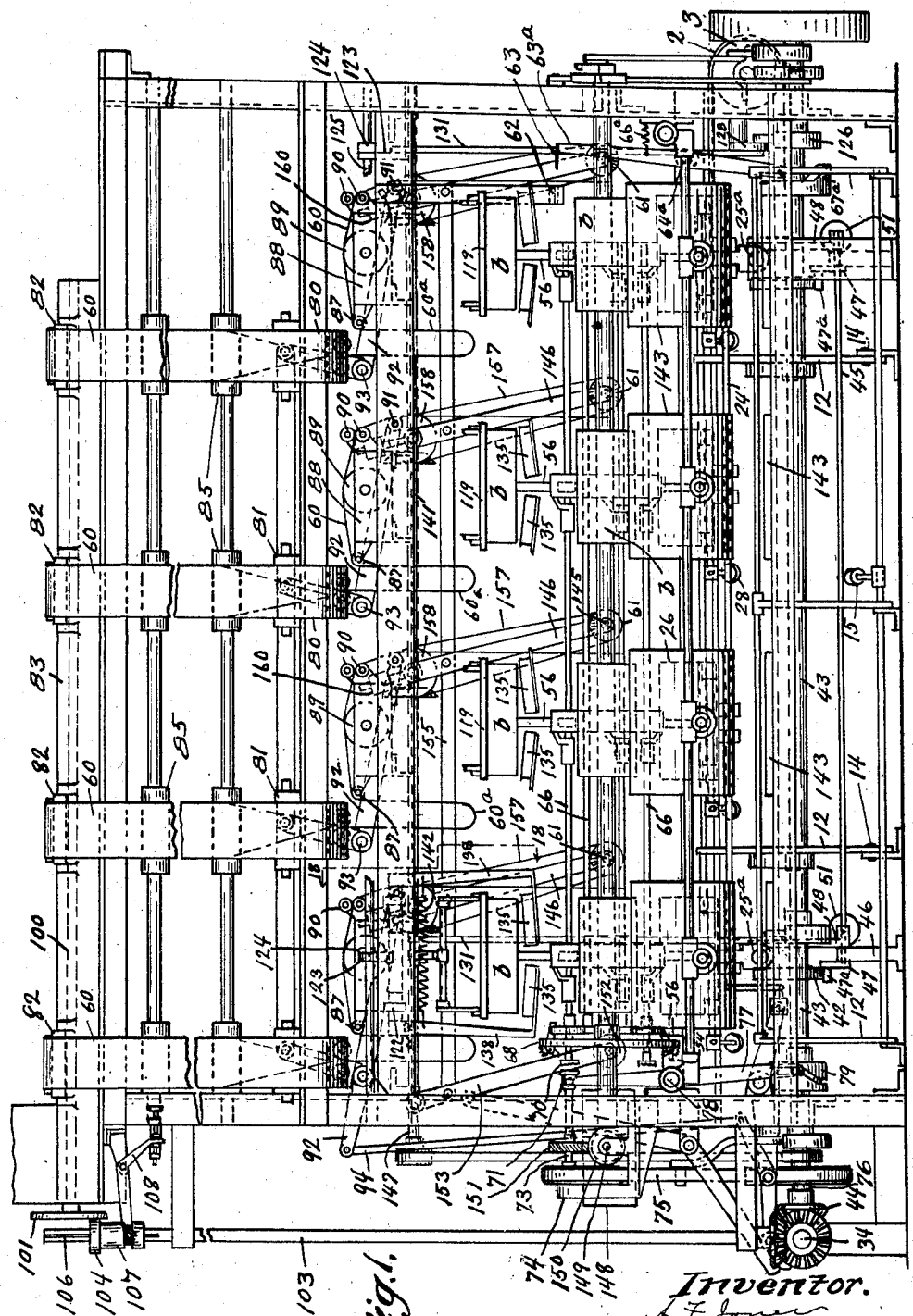

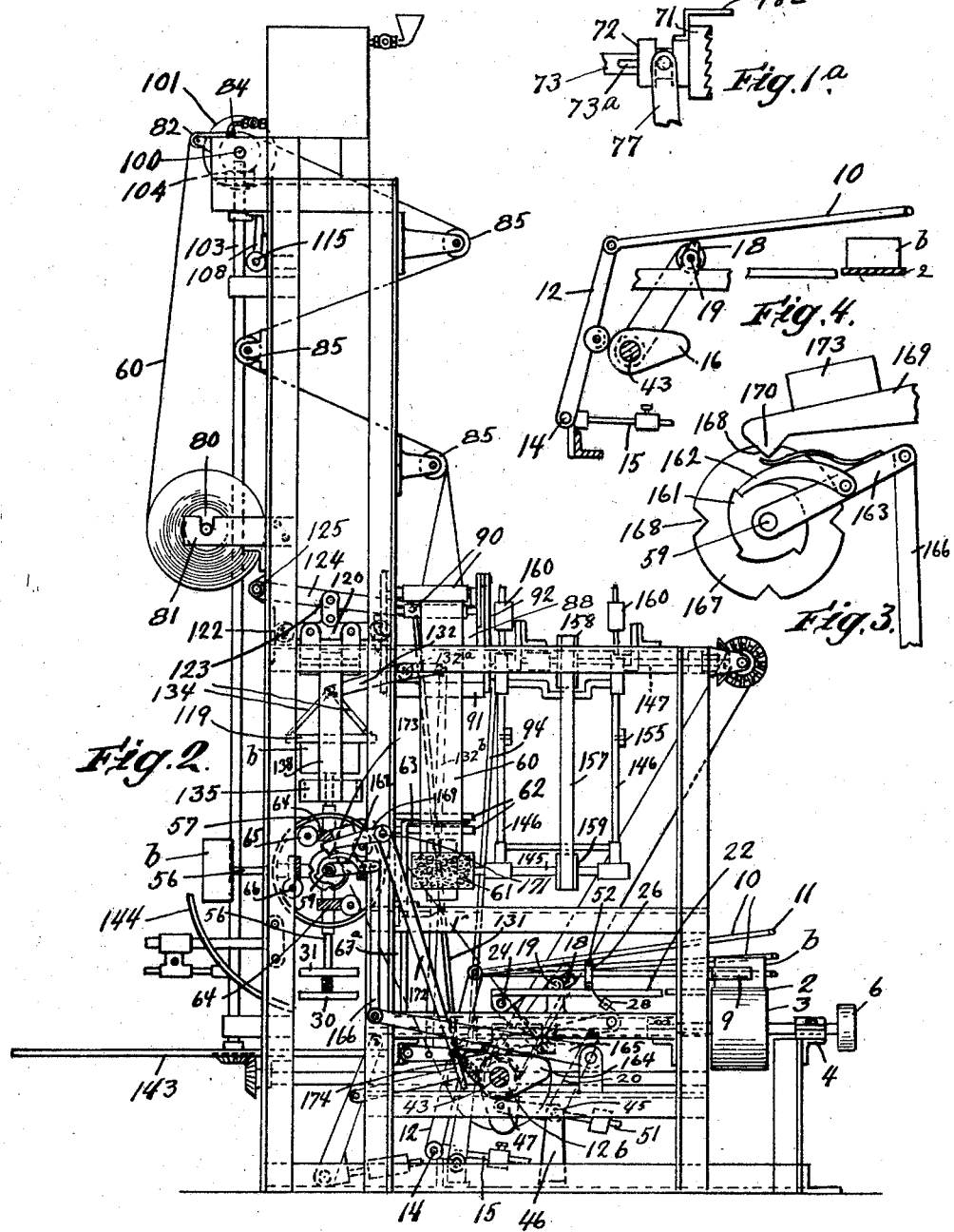

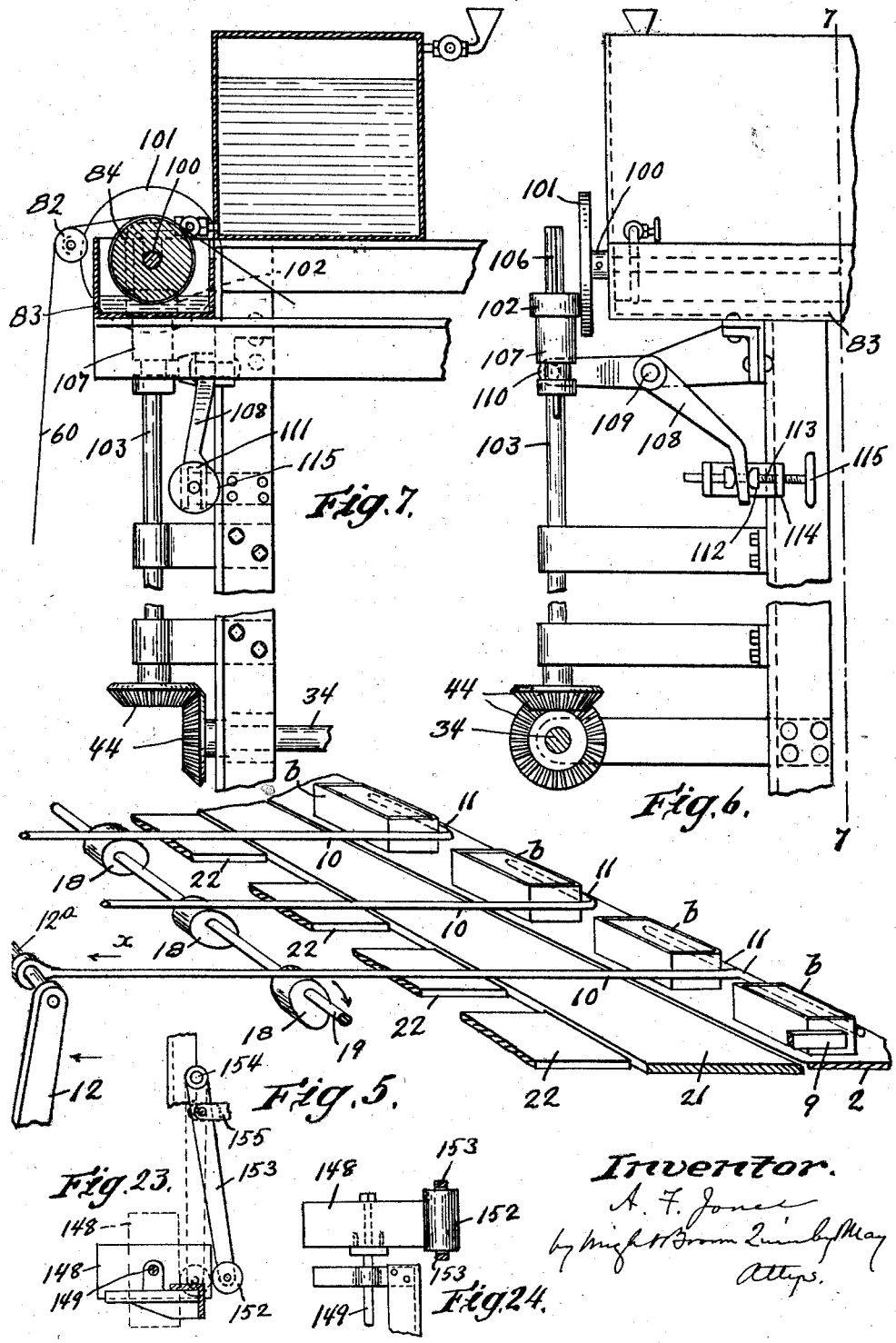

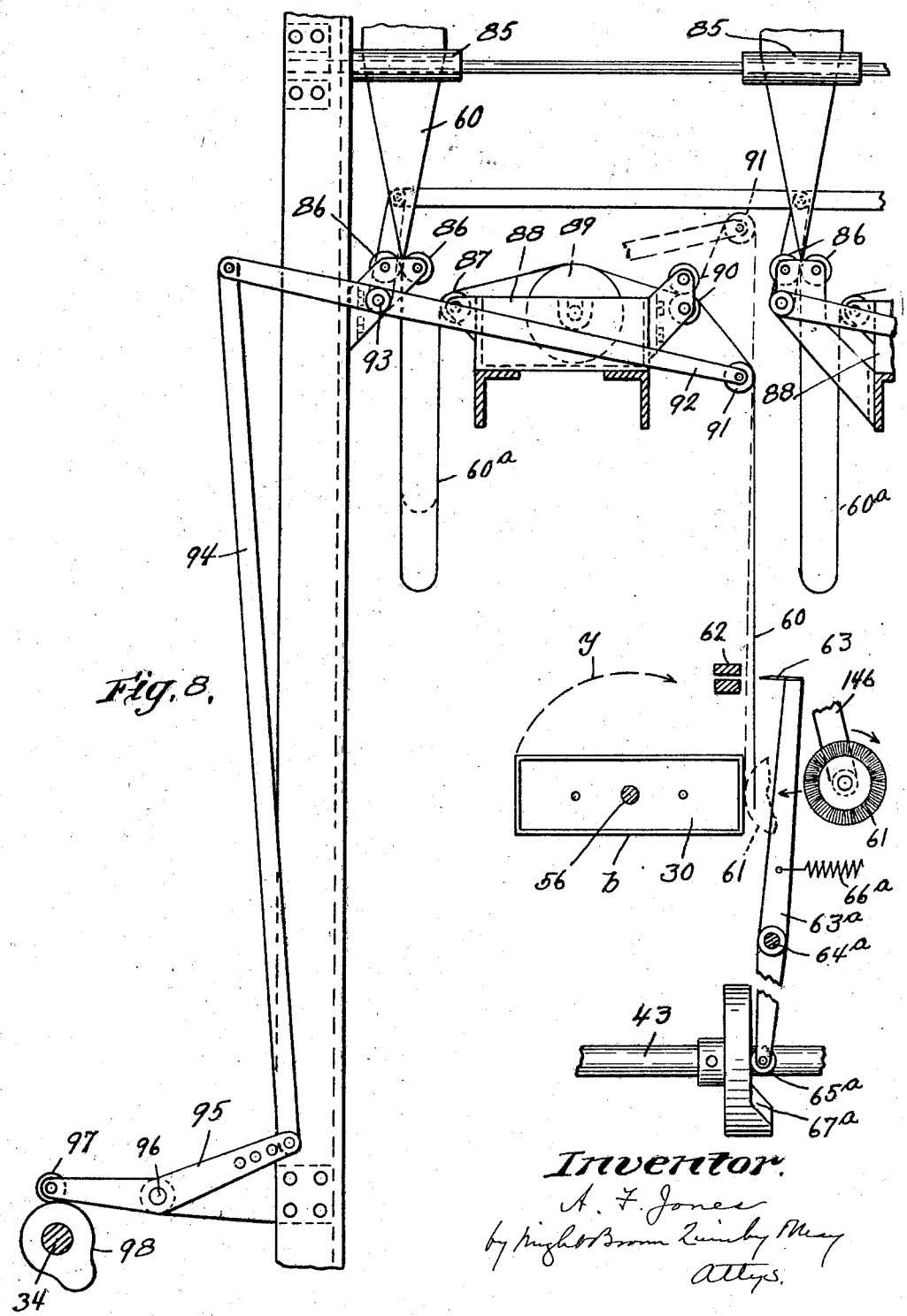

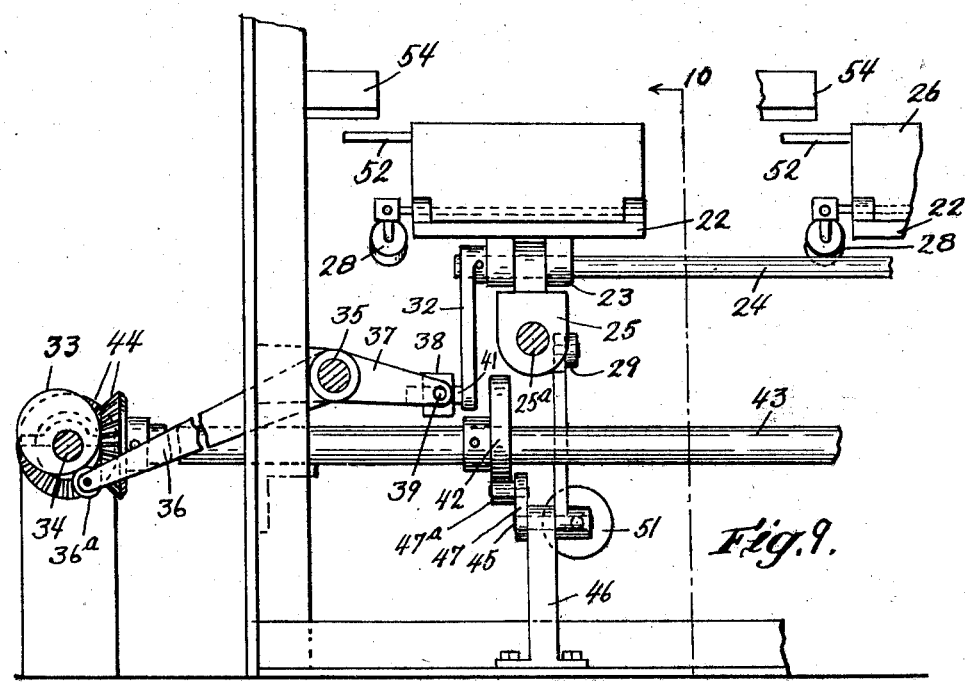
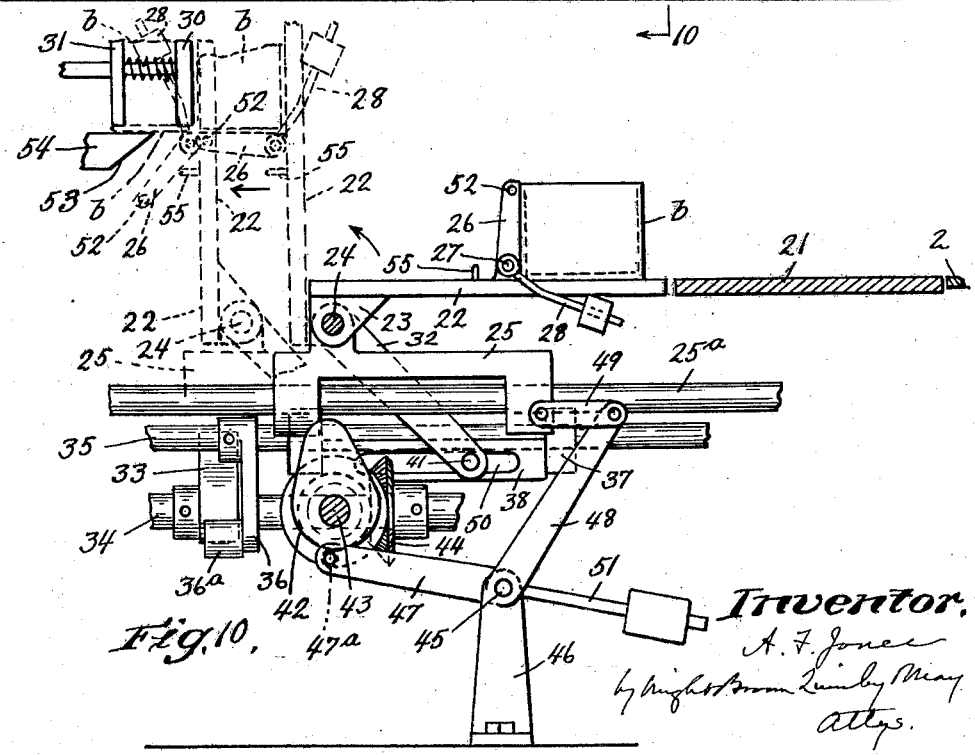

Feb. 10, 1925.

A. F. JONES 1,525,612

BOX COVERING MACHINE

Filed March 13, 1924     8 Sheets-Sheet 7

Inventor:
A. F. Jones

Feb. 10, 1925.
A. F. JONES
1,525,612
BOX COVERING MACHINE
Filed March 13, 1924    8 Sheets-Sheet 8
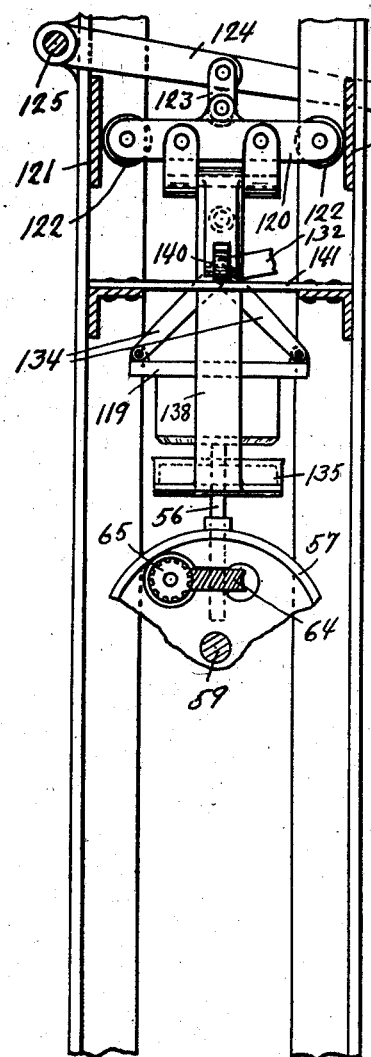
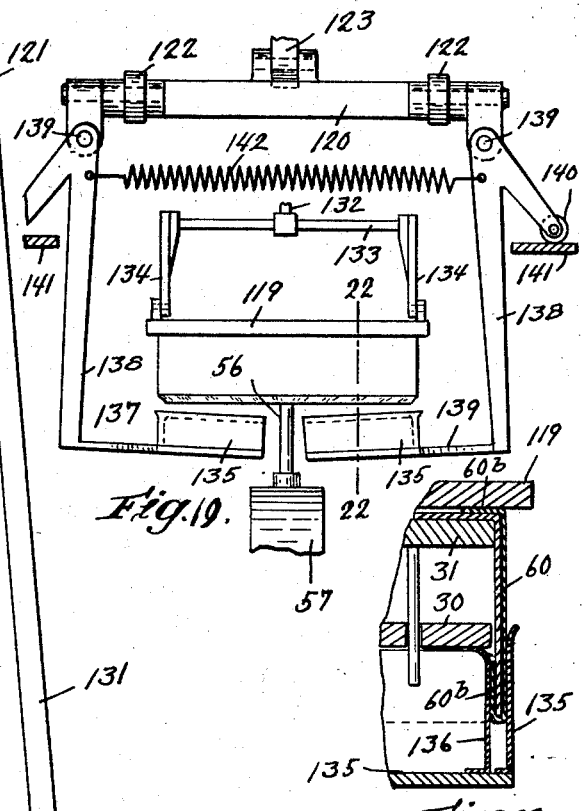
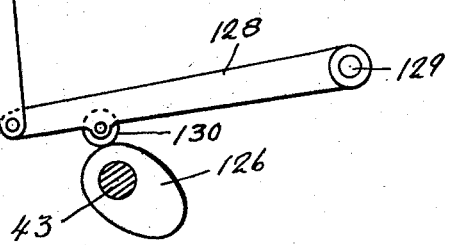
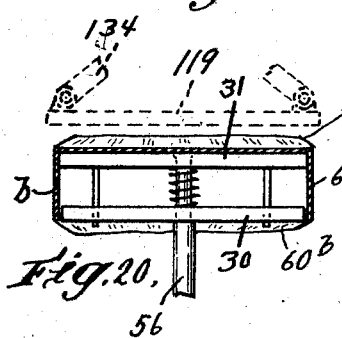
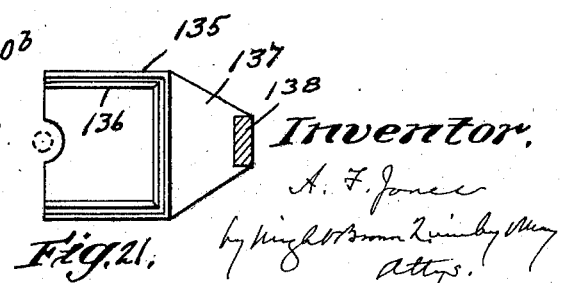

Patented Feb. 10, 1925.

1,525,612

UNITED STATES PATENT OFFICE.

ALBERT F. JONES, OF SALEM, MASSACHUSETTS, ASSIGNOR TO HOAGUE-SPRAGUE CORPORATION, OF LYNN, MASSACHUSETTS, A CORPORATION OF MASSACHUSETTS.

BOX-COVERING MACHINE.

Application filed March 13, 1924. Serial No. 698,836.

*To all whom it may concern:*

Be it known that I, ALBERT F. JONES, a citizen of the United States, residing at Salem, in the county of Essex and State of Massachusetts, have invented new and useful Improvements in Box-Covering Machines, of which the following is a specification.

This invention relates to machines for applying a finishing cover or veneer of relatively thin paper to boxes of relatively thick paper, pasteboard, or the like, made by an automatic box machine.

The object of the invention is to provide an efficient and rapidly operating covering machine, adapted to act automatically in timed relation to the box machine, and cover the boxes without human intervention, as fast as they are delivered by the box machine.

I attain this object by the improved organization hereinafter described and claimed.

Of the accompanying drawings forming a part of this specification,—

Figure 1 is a front elevation of a covering machine embodying the invention.

Figure 1ᵃ is an enlargement of a portion of Figure 1.

Figure 2 is an end elevation of the machine.

Figures 3 and 4 are fragmentary views, showing details shown by Figure 2, somewhat enlarged.

Figure 5 is a fragmentary perspective view, showing portions of the box-transferring mechanism hereinafter described.

Figure 6 is an enlargement of another portion of Figure 1.

Figure 7 is a section on line 7—7 of Figure 6, and an elevation of the structure at the left of said line.

Figure 8 is a fragmentary view, partly in elevation and partly in section, showing the web-guiding and web-severing mechanism.

Figure 9 is a fragmentary elevation showing portions of one of the duplicate covering mechanisms hereinafter described.

Figure 10 is a section on line 10—10 of Figure 9, and an elevation of the structure at the left of said line.

Figure 11 is a fragmentary view, showing partly in section and partly in elevation one of the rotary carriers.

Figure 12 is a section on line 12—12 of Figure 11, and an elevation of the structure at the right of said line.

Figures 13 and 14 are fragmentary views, showing details of the mechanism shown by Figures 11 and 12.

Figure 18 is an enlarged section on line 18—18 of Figure 1, and an elevation of the structure at the left of said line.

Figure 19 is a fragmentary view, showing in elevation, portions of the structure shown by Figure 18.

Figure 20 is a fragmentary view, showing one of the forms hereinafter described, a box thereon, and a cover applied to the box.

Figure 21 is a top plan view of one of the cover-tucking members, shown by Figures 18 and 19.

Figure 22 is a fragmentary sectional view, illustrating the action of one of the tucking members.

Figures 23 and 24 are fragmentary views showing details.

The same reference characters indicate the same parts in all of the figures.

Figure 15:
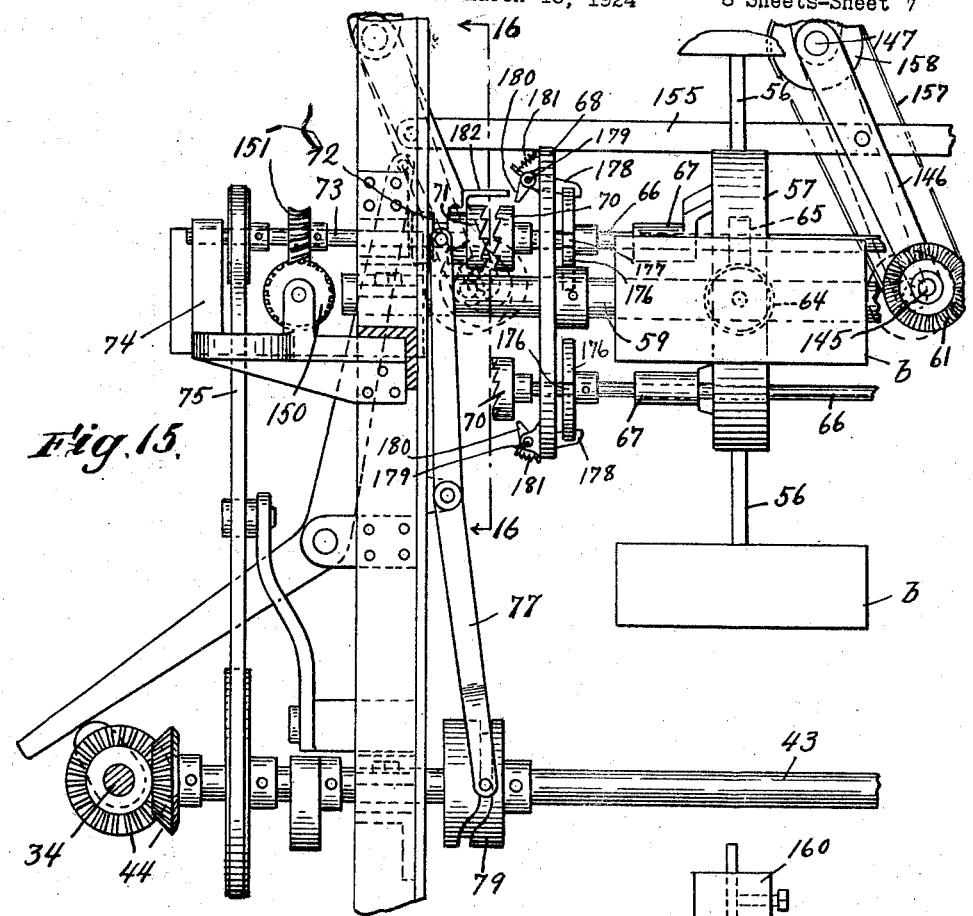
Figure 15 is an enlargement of another portion of Figure 1.

The machine is organized to act on boxes delivered by a box-making machine, in a rough or unfinished condition, without the finishing veneer or covering of thin paper which is applied by the covering machine of my invention.

The boxes are deposited automatically, one by one on a horizontal stretch of a continuously moving conveyor belt, which is an element of the covering machine common to the series of duplicate mechanisms hereinafter described. The boxes are delivered at regular intervals by the box machine, so that the belt carries a procession of boxes. The covering machine automatically removes the boxes in groups of a predetermined number, four in this instance, the boxes of the group being uniformly spaced apart while on the belt, transferred from the belt in a direction at right angles to the path of the belt, and simultaneously covered after they are transferred.

The covering machine includes a series of duplicate covering mechanisms arranged side by side in a row parallel with the path of the conveyor belt, each covering mechanism being arranged to act on a group transferred from a given position of the belt, so that four boxes at a time are transferred from the belt and covered.

The covering machine is timed with relation to the box machine, to transfer and cover the boxes as fast as they are delivered by the box machine.

I will now describe the conveyer belt, the preferred transferring means, and one of the four covering mechanisms to which the transferred boxes are simultaneously presented, it being understood that the belt is elongated, and adapted to maintain a box procession of sufficient length to enable the transferring mechanism to simultaneously transfer four boxes from the belt, and that the transferred boxes are covered in the time required to enable the belt to advance a sufficient number of boxes to form four more boxes, which are in turn transferred and covered.

2 designates the continuously moving conveyor belt, on to the upper horizontal stretch of which boxes $b$ to be covered are deposited automatically, as they are delivered by a box machine. The belt is supported by pulleys 3, journaled in bearings 4. One of the pulleys is driven by a sprocket chain 5, engaged with a sprocket-wheel 6, on the pulley shaft and with a sprocket-wheel 7, on a shaft 8, driven as hereinafter described, by the power of the machine.

Projecting over the belt is a fixed stop 9, shown by Figure 5. This stop is located in position to arrest a box $b$ forming the leading member of a group to be acted on by the duplicate covering mechanisms.

A description of one of the covering mechanisms will be sufficient for each, it being understood that the several covering mechanisms are connected for simultaneous operation by the power of the machine. The box-transferring mechanism here shown includes a series of rakes, each composed of a rod 10 and a head 11. The rods 10 are adapted to arrest uniformly spaced apart, the three boxes following the one arrested by the stop 9. The heads 11 are adapted to bear on the outer sides of the boxes, one of the rakes including two heads 11, as shown by Figure 5.

The rakes are movable endwise by oscillatory levers 12, (Figure 2), fixed to a rock-shaft 14, having a weighted arm 15, which holds the levers 12 against cams 16, fixed to a shaft 43.

The rake rods 10 are pivotally connected with the levers 12 by a pivot-rod $12^a$, fixed to, and extending between the levers, and are raised and lowered by cams 18 (Figure 5), fixed to a shaft 19, rotated by a sprocket-chain 20, running on sprocket-wheels, fixed to the shafts 17 and 19. The cams 18 are timed to raise and lower the rods 10 successively. The foremost rod shown in Figure 5 is lowered after the first box has been arrested by the stop 9, and arrests the second box. The other rods 10 are lowered successively in time to arrest the third and fourth boxes. The rake heads 11 now bear on the outer sides of the boxes, and transfer the boxes by a raking action, when the rakes are moved in the direction indicated by the arrow $x$ in Figure 5. The boxes are thus simultaneously transferred across a fixed table 21, to four swinging tables 22 (Figures 5 and 10). Each table 22 is an element of one of the four duplicate covering mechanisms next described, so that a description of one of said tables will suffice for all.

The table 22 is arranged to oscillate vertically between two adjacent rake rods 10, and is provided with ears 23, which are fixed to a rock-shaft 24, supported in bearings on a slide 25, which is movable horizontally on a fixed horizontal guide rod $25^a$, to the positions shown by full and dotted lines (Figure 10). The table 22 is provided with a swinging stop 26, pivoted at 27 and normally held by a weighted arm 28, perpendicular to the table, so that it arrests a box $b$ as shown by Figure 10, in the position to which the box is transferred, as above described.

The table 22 is swung to the right-hand dotted line position shown by Figure 10, while the slide 25 is in the position shown by full lines. The slide is then moved with the tables to the left as viewed in Figure 10, to place the box $b$ upon a revolving form, whereby the box is supported while it is being covered, as hereinafter described. Said form is one of four forms, mounted as shown by Figures 11 and 12, to revolve in unison. Each form includes two rectangular spaced apart heads 30 and 31, formed to enter a box when the latter is moved toward the form, as shown by dotted lines in Figure 10.

The rock-shaft 24 is turned to swing the table 22 upward, by mechanism including an arm 32, (Figure 9), fixed to the rock-shaft, a cam 33 fixed to a power-driven shaft 34, and intermediate devices including a rock-shaft 35 in fixed bearings, an arm 36, fixed to the rock-shaft, and having a trundle-roll $36^a$ bearing on the perimeter of the cam 33, spaced apart arms 37, fixed to the rock-shaft 35, and a block 38, between the arms 37 and pivotally connected therewith by trunnions 39 (Figure 9), the block receiving a wrist-pin 41, on the arm 32. The arrangement is such that the rotation of the cam 33 imparts an oscillating movement to the table 22, while the slide 25 is in the full line position.

The slide 25 is moved to the dotted line position after the table is swung upward by mechanism including a cam 42, on a power-driven shaft 43, connected by bevel gears 44 with the shaft 34, a short rock-shaft 45, journaled in fixed standards 46, and provided with arms 47 and 48, the arm 47 having a trundle-roll 47ª, bearing on the perimeter of the cam 42, and a link 49, connecting the arm 48 with the slide 25. The slide is provided with a horizontal slot 50, receiving the wrist-pin 41, and permitting endwise movements of the slide. The arrangement is such that the rotation of the cam moves the slide to the left, when the table 22 is turned upward.

The rock-shaft 45 has a weighted arm 51, holding the trundle roll 47ª against the cam 42.

When the raised table is moved to the left to place a box on a form, a finger 52 on the stop 26 encounters an inclined face 53, on a projection 54, fixed to the frame of the machine, so that the stop is swung downward, out of contact with the box, to the lower dotted line position Figure 10, where it is arrested by a stop stud 55 on the table, the weighted arm 28 being thus thrown over to position to hold the stop 26 against the stud 55. When the table 22 returns to its horizontal position, the arm 28 restores the stop 26 to the operative position shown by full lines Figure 10.

Each covering mechanism includes four forms, each composed of heads 30 and 31. The forms are fixed to shafts 56, journaled in and radiating from a circular carrier 57 (Figures 11 and 12) having a hub 58, fixed to a power-driven shaft 59, said carrier having spaced apart radial bearings 60, in which the shafts 56 are journaled.

The shaft 59 and the carrier are rotated step by step, by mechanism hereinafter described, to bring each of the four forms into position to remove a box from the table 22, each form being held stationary in position to receive a box, and then moved by the rotation of the carrier, and held stationary in three other positions for purposes hereinafter described.

The form shown by Figure 10, in position to receive a box from the table 22, is the one shown at the right in Figure 12, and is the one shown by Figure 8, this being called the receiving form. After table 22 has left this receiving form, one end of a web 60 of box-covering paper, coated with paste on one side, is pressed against one end of the box $b$, on the receiving form, by a rotary brush 61, which is rotated, and oscillated while rotating.

The shaft 56 of the receiving form is at the same time rotated to rotate the box, as indicated by the arrow $y$ (Figure 8) and cause the wrapping of the web around the four sides of the box. The web is severed by the conjoint action of a fixed cutting member 62, and a reciprocating cutting member 63, before the box is covered. The member 63 is fixed to one arm of a lever 63ª fulcrumed at 64ª, and having a trundle roll 65ª, pressed by a spring 66ª against a cam 67ª on a power-driven shaft.

The receiving form is the only one of the series of forms which is rotated, and the rotation of this form is effected as next described.

The form shaft 56 is provided with a skew gear 64, (Figure 12) meshing with a skew-gear 65, on a shaft 66, which is journaled in a bracket 67 (Figure 11), fixed to the carrier 57. There are four shafts 66, connected as described, with the four form shafts 56, and the shafts 66 are journaled in bearings in a disk 68 (Figures 1 and 11), having a hub 69, fixed to the shaft 59. To one end of each shaft 66 is fixed a one-way driven clutch member 70, adapted to engage a complemental driving clutch member 71 (Figure 1). The shafts 66 are elongated and are elements which are common to the four covering mechanisms, the shafts being connected through duplicates of the skew-gears with the shafts 56 of the several mechanisms. The one-way clutch members 70 are also elements common to the four covering mechanisms, each elongated shaft 66 having a clutch member 70 at its outer end. The elongated shafts 66 are moved laterally in a circular path, when the carriers 57 are rotated step by step, and the driven clutch member 70 of each shaft is presented in turn to the driving clutch member 71, which is fixed to a collar 72 (Figure 1ª), slidable on a short power driven shaft 73, and engaged with the latter, as by a feather 73ª (Figure 1ª) on the shaft and a slot in the collar 72, so that the driving member 71 is adapted to be moved endwise into and out of engagement with a driven member 70, brought into alinement with it.

The shaft 73 is journaled in a bearing 74 (Figure 1) and is driven by a belt 75, from a driving shaft 76. The driving clutch member is reciprocated on the shaft 73 by a lever 77, fulcrumed at 78 (Figure 1), and engaged at one end with a cam groove 79, on a disk fixed to the shaft 76, and at its other end with a groove in the collar 72. The arrangement is such that the clutch member 70 of the elongated shaft 66, connected with the receiving form, is engaged by the driving clutch member 71, while the carrier 57 is at rest and is rotated to rotate the receiving form and cause the wrapping of the cover on the box supported by said form.

The web 60 is stored in rolled form on a loosely rotating core or drum 80 (Figure 2), journaled in bearings 81. The web passes from the drum to a guide roll 82, beside a trough 83 containing water which is applied to the web by a moistening feed roll 84 in the trough, said roll being driven at a variable speed, as hereinafter described. The web passes over the feed roll and is moistened thereby. From the feed roll the web passes in a zigzag course, over loose guide rolls 85. At the lower guide roll the web is given a quarter turn, as shown by Figure 8, and passes between two pressure rolls 86, journaled in fixed bearings. A portion of the web depends in the form of a loose bight 60$^a$ (Figure 8), between the rolls 86 and a roll 87, at one end of a paste tank 88, having a paste-applying roll 89 over which the web passes to a pair of pressure rolls 90 at the opposite end of the tank. From the rolls 90 the leading end portion of the web passes downward to the point where it is applied to a box. This end portion is raised, as shown by dotted lines in Figure 8, after the box is wrapped, by an oscillating roll 91 (Figure 8), on one arm of a lever 92, which is fulcrumed at 93. The other arm of the lever 92 is connected by a rod 94 with a rocking lever 95, fulcrumed at 96, and having a trundle roll 97, bearing on a cam 98, which is fixed to a power-driven shaft 34.

The feed roll 84 is fixed to a shaft 100 (Figures 6 and 7) having at one end a disk 101, constituting an element of a friction drive, whereby the feed roll is variably driven. The other element of this drive is a roll 102, slidable on a vertical power driven shaft 103, and rotatably connected therewith by means such as a feather 106 (Figure 7) on the shaft, engaging a groove in a hub or sleeve 107, fixed to the roll 102.

The sleeve and roll are adjustably confined with the roll at any desired distance from the axis of the disk 101, by a lever 108, fulcrumed at 109. One arm of said lever is engaged with a groove 110 in the sleeve 107, and the other arm has a slot 111 (Figure 6), confined between two collars 112 on a screw-threaded rod 113, which is horizontally adjustable by rotation in a tapped orifice in a fixed bracket 114, the rod having a knurled head or handle 115, whereby it may be rotated. Provision is thus made for driving the feed roll 84 and feeding the web at any speed that may be required by the size of the boxes being covered.

The object of the bight 60$^a$ is to prevent strain on the portion of the web between the rolls 86 and 89, so that this portion, which is moistened and tender, is not likely to be torn by the pull exerted on it by the roll 89.

The object of raising and lowering the end portion of the web by the roll 91 is to enable the web to be cut at a point well elevated above the brush 61, the cut end being then lowered by the depression of the roll 91 to contact with a box.

The object of the staggered guide rolls 85 is to conduct the moistened web in a zigzag course and afford time for the moisture to penetrate the paper.

The width of the web 60 is greater than that of the sides of the box, so that the edge portions of the web project in the form of flanges 60$^b$ from opposite edges of the box sides, these flanges being bent or inclined inward by the brush 61, as shown by Figure 20, so that they are in position to be disposed of by flattening one of the flanges against the bottom of the box and tucking in the other flange against the inner surfaces of the box sides, as next explained.

After a box has been covered, the form supporting it is moved by a partial rotation of the carrier to the highest position shown by Figure 12, and to the position shown by Figures 18 and 19. While the form is in this position, a platen 119 descends upon the upper flange 60$^b$ and flattens it upon the bottom of the now inverted box. The platen is alternately raised, as shown by Figure 20, and lowered, as shown by Figures 18, 19 and 22, by means comprising a movable cross head 120, guided by fixed vertical tracks 121 (Figure 18), on which rolls 122 on the ends of the cross head are movable.

The cross head is suspended by a link 123, from a lever 124, fulcrumed at 125, and vertically oscillated by a cam 126 on a power-driven shaft 43, a lever 128 fulcrumed at 129 and having a trundle roll 130, bearing on the cam, and a rod 131 connecting the levers 124 and 128. The platen 119 is supported from the cross head 120 by a rod 132, connected at its upper end with the cross head and having arms 133 (Figure 19) at its lower end, and links 134 connecting said arms with the platen.

The lower flange 60$^b$ is tucked into the lower open side of the inverted box by angular tucking jaws, each composed of an angular outer wall 135, and an angular inner wall 136, spaced from the outer wall as shown by Figure 21. Said jaws are supported by shanks 137, fixed to the lower ends of bell-crank levers 138, fulcrumed at 139. Said levers have longer arms to which the shanks 137 are secured, and shorter arms having trundle rolls 140, arranged to abut against fixed horizontal tracks 141. When the cross head 120 is depressed, the tracks 141 are encountered by the rolls 140, and the levers 138 are moved to the positions shown by Figure 19, the tucking jaws being thus held out of contact with the box. When the cross head is raised a spring 142, connecting the bell-crank levers, swings said levers inward, so that while the cross head is rising, the tucking jaws tuck the lower flange 60ᵇ into the mouth of the box, as shown by Figure 22.

The covering is completed by the tucking operation. The next partial rotation of the carrier 57 brings the box to the left hand position shown by Figure 12, and while the box is held in this position, it may be acted on by printing means (not shown).

When a form is brought by the next partial rotation of the carrier to the lowest position shown by Figure 12, the covered box drops from the form upon a guide 143 (Figure 2), whereby it is conducted from the machine.

A fixed curved guard 144 (Figure 2) prevents a box moving downward from the left hand position from dropping from the form until the latter reaches its lowest position.

The brush 61 of each covering mechanism is fixed on a shaft 145 (Figure 2), journaled in bearings on the swinging end of oscillatory arms 146, which are pivoted on a center formed by a shaft 147. Said arms are oscillated to permit the brush to bear successively against each of the four sides of a box b, and press the covering web against said sides, by mechanism which includes a continuously rotating block or pattern 148, best shown by Figures 23 and 24, and shown also by Figure 1.

Figure 16:
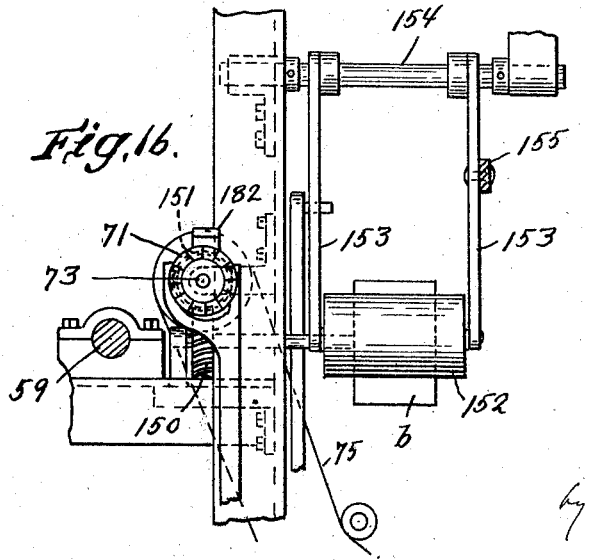
Figure 16 is a section on line 16—16 of Figure 15, and an elevation of the structure at the right of said line.
Figure 17:
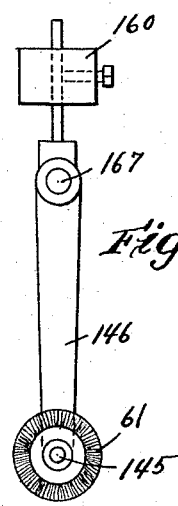
Figure 17 is a fragmentary detail view.

The pattern corresponds in size and shape to the boxes, and is fixed to a shaft 149, having a gear 150, meshing with a gear 151, on the continuously rotating shaft 73, which carries the clutch member 70. The brush-oscillating mechanism also includes a roll 152 (Figures 16, 23 and 24), journalled loosely in the swinging ends of oscillatory arms 153, which are mounted to swing loosely on a fixed stud 154 (Figure 16). One of the arms 153 is connected by a rod 155 with the brush-carrying arm 146. The roll 152 contacts yieldingly with the pattern 148, and is oscillated with the arms 153 by the rotation of the pattern. The oscillations of the roll are imparted to the brush 61, through the arms 153 and the connecting-rod 155. As shown by Figures 1 and 15, the rod 155 is elongated and connected with each of the brush-carrying arms 146, so that the several brushes 61 are oscillated in unison.

The brush is rotated while oscillating by a belt 157 (Figure 2) running on pulleys 158 and 159, fixed respectively to the shaft 147 and the brush shaft 145. The shaft 147 is continuously rotated by the connections between it and the main shaft 43, shown by Figure 2. The brush-carrying arms 146 are provided with weights 160, which yieldingly press the brush against a box.

The mechanism for rotating the form carrier 57 is best shown by Figures 2 and 3.

To the carrier shaft 59 is fixed a ratchet 161, engaged by a pawl 162, which is pivoted to an arm 163, mounted to oscillate loosely on the carrier shaft. The main shaft 43 has a cam 164 which vertically oscillates a rocker-arm 165, pivoted at one end to a fixed support. The other end of the rocker-arm is connected by a rod 166 with the pawl-carrying arm 163.

The described mechanism is adapted to rotate the form carrier one quarter of a complete rotation at each step.

To ensure the accurate stoppage of the carrier at the end of each step, I provide detent mechanism, including a disk 167, fixed to the shaft 59, and provided with four notches 168, and a detent arm 169, having a V-shaped tooth 170, adapted to engage a notch 168 at the upper side of the disk, as shown by Figure 3. The detent arm is fixed to a rock-shaft 171 (Figure 2), journaled in fixed bearings and provided with an arm 172, held by a weight 173 on the detent arm against a cam 174 on the main shaft 43. The detent mechanism locks the form carrier at the end of each step and releases it before the next step.

Rotation of a form in each of the positions, excepting the receiving position, is prevented by means shown by Figures 11, 13, 14 and 15, and including disks 176, fixed to the shafts 66, and provided with notches 177 (Figure 14) detents 178, fixed to studs 179 which are journaled in ears on the disk 68, and are adapted to enter said notches, ears 180 fixed to said studs, and springs 181 adapted to yieldingly hold the detents in engagement with the disks 176, as indicated by Figures 11 and 15.

When each form is in its receiving position, the accompanying detent 178 is displaced to release the form by a tappet arm 182 (Figures 1ᵃ and 15) fixed to the sliding clutch member 71, and arranged to strike an ear 180 and displace the accompanying detent when the clutch member is moved to position to rotate a form.

I claim:

1. A box-covering machine comprising, in combination, a conveyor adapted to receive boxes issuing from a box-making machine and convey a plurality of boxes in a procession, a plurality of box-covering mechanisms arranged in a row beside, and spaced from the conveyor, each covering mechanism including a rotary carrier and a plurality of box-holding forms revolved in a circular path by the carrier, and each rotatable on an axis at right angles to the axis of the carrier, raking mechanism for simultaneously transferring a predetermined number of boxes from the conveyor toward the covering mechanisms, and applying mechanisms for placing the transferred boxes on forms of the several covering mechanisms, said covering mechanisms including means for applying covering webs to boxes supported and rotated by said forms.

2. A box-covering machine substantially as specified by claim 1, comprising also a fixed stop projecting over said conveyor in position to arrest and position the foremost box of the procession, the said raking mechanism including a series of box-engaging rakes, projecting over the carrier, and means for operating said rakes, the arrangement being such that boxes following the foremost box are arrested by the rakes in spaced relation to each other and to the foremost box, and all the arrested boxes are simultaneously transferred from the conveyor.

3. A box-covering machine substantially as specified by claim 1, said applying mechanisms including oscillatory tables to which the boxes are transferred by the raking mechanism, displaceable stops positioning the boxes on said tables, and mechanism for swinging said tables to place the boxes on said forms, and withdraw the tables from the forms, means being provided for displacing the stops when the boxes are placed on the forms.

4. A box-covering mechanism comprising a rotary carrier, means for rotating the carrier step by step, radial shafts journaled on the carrier, forms fixed to said shafts, means for rotating one of the shafts and its form when the same are in a predetermined position, and mechanism for applying a cover to a box on the rotating form, said applying mechanism including a positively rotated brush adapted to press the cover against the box sides, and form incipient flanges on the web while the box is rotating, and flange-completing instrumentalities adapted to flatten one of said flanges against the bottom of the box and to tuck the other flange into the mouth of the box when the box is stationary.

5. A box-covering mechanism comprising a rotary carrier, means for rotating the carrier step by step, radial shafts journaled on the carrier, forms fixed to said shafts, means for rotating one of the shafts and its form when the same are in a predetermined position, mechanism for applying a cover to a box on the rotating form, and mechanism for preparing a covering web for attachment, and for presenting the prepared web to a rotating box, said mechanism including web-feeding means, web-guiding means adapted to conduct a web in an elongated path, web-moistening means, web-coating means for applying an adhesive to the web, and web-severing means, said preparing and presenting mechanism having provisions for alternately raising and lowering an end portion of the web.

6. A box-covering mechanism comprising a rotary carrier, means for rotating the carrier step by step, radial shafts journaled on the carrier, forms fixed to said shafts, means for rotating one of the shafts and its form when the same are in a predetermined position, and mechanism for applying a cover to a box on the rotating form, said applying mechanism including a positively rotated brush adapted to press the cover against the box sides, and means including a revolving pattern for oscillating said brush.

7. A box-covering mechanism comprising a rotary carrier, means for rotating the carrier step by step, radial shafts journaled on the carrier, forms fixed to said shafts, means for rotating one of the shafts and its form when the same are in a predetermined position, mechanism for applying a cover to a box on the rotating form, and mechanism for preparing a covering web for attachment, and for presenting the prepared web to a rotating box, said mechanism including web-feeding means, web-guiding means adapted to conduct a web in an elongated path, web-moistening means, web-coating means for applying an adhesive to the web, and web-severing means, said web-feeding means including a friction drive having an adjustable member, whereby the feeding of the web may be proportioned to the size of the box.

8. A box-covering mechanism comprising a rotary carrier, means for rotating the carrier step by step, detent means adapted to lock the carrier after each step, radial shafts journaled on the carrier, forms fixed to said shafts, each shaft having a clutch member, a power-driven shaft, journaled in fixed bearings and having a sliding clutch member with which clutch members on the form-carrying shafts are brought successively into alinement, and means for engaging the sliding clutch member with a clutch member on a form-carrying shaft.

9. A box-covering machine comprising, in combination, a row or series of duplicate box-covering mechanisms including box-holding forms, a row or series of box-applying mechanisms adapted to place boxes on said forms, and a conveying mechanism common to said applying mechanisms, and adapted to convey a procession of boxes from a box-making machine and to transfer boxes in groups of a predetermined number to said applying mechanisms.

10. A box-covering machine comprising, in combination, a row or series of duplicate box-covering mechanisms including box-holding forms, a row or series of box-applying mechanisms adapted to place boxes on said forms, and a conveying mechanism common to said applying mechanisms, and adapted to convey a procession of boxes from a box-making machine and to transfer boxes in groups of a predetermined number to said applying mechanisms, said conveying mechanism including an endless conveyor adapted to receive boxes from a box machine and convey the boxes in a procession, and a plurality of rakes adapted to transfer a group of boxes from said conveyor to said applying mechanisms.

11. In a box-covering machine comprising a rotary carrier, means for rotating the carrier step by step, means for locking the carrier at the end of each step, radially arranged form-carrying shafts, journaled on the carrier, forms fixed to said shafts, the arrangement being such that each form is revolved about the axis of the carrier, and is held first in a receiving position, then in one or more intermediate positions, and finally in a delivering position, means for applying a box to a form held in a receiving position, means for independently rotating the form on its own axis while in a receiving position, means for applying a covering strip to a box on the form while the latter is rotating, so that the strip is wound upon the box, and means for preventing rotation of the form while in the other positions specified.

12. In a box-covering machine comprising a rotary carrier, means for rotating the carrier step by step, means for locking the carrier at the end of each step, radially arranged form-carrying shafts, journaled on the carrier, forms fixed to said shafts, the arrangement being such that each form is revolved about the axis of the carrier, and is held first in a receiving position, then in one or more intermediate positions, and finally in a delivering position, means for applying a box to a form held in a receiving position, means for independently rotating the form on its own axis while in a receiving position, means for applying a covering strip to a box on the form while the latter is rotating, so that the strip is wound upon the box, means for preventing rotation of the form while in the other positions specified, and means for pressing edge portions of the covering strip against the box while rotation of the form is prevented.

In testimony whereof I have affixed my signature.

ALBERT F. JONES.